United States Patent [19]

Shannon et al.

[11] 4,042,482
[45] Aug. 16, 1977

[54] SUBSTITUTED LITHIUM ORTHOSILICATES AND SOLID ELECTROLYTES THEREFROM

[75] Inventors: Robert Day Shannon, Wilmington; Barry Edward Taylor, Claymont, both of Del.

[73] Assignee: E. I. Du Pont de Nemours and Company, Wilmington, Del.

[21] Appl. No.: 718,031

[22] Filed: Aug. 26, 1976

Related U.S. Application Data

[63] Continuation-in-part of Ser. No. 651,585, Jan. 22, 1976, abandoned.

[51] Int. Cl.² .................... C25B 9/00; C01B 33/26; H01M 10/36
[52] U.S. Cl. .................... 204/242; 252/62.2; 423/327; 423/332; 429/104; 429/191; 429/193
[58] Field of Search .................... 429/104, 193, 191; 423/327, 332, 567, 306; 252/62.2; 204/1 S, 195 S, 242

[56] References Cited

U.S. PATENT DOCUMENTS

| 3,736,186 | 5/1973 | Liang | 429/191 |
| 3,824,130 | 7/1974 | Liang | 429/193 |
| 3,911,085 | 10/1975 | Bither et al. | 429/191 |

*Primary Examiner*—Donald L. Walton

[57] ABSTRACT

Substituted lithium orthosilicates are provided having a. the formula $$Li_{4+w-x-2y}Si_{1-w-x-y}Al_wP_xS_yO_4$$

wherein
w is 0 to about 0.45,
x is 0 to about 0.5, and
y is 0 to about 0.35,
with the proviso that one or both of w or x+2y is at least about 0.1, and b. the monoclinic $Li_4SiO_4$ crystal structure. These substituted orthosilicates are useful as solid electrolytes in electrochemical cells such as galvanic cells and electrolytic cells.

13 Claims, 5 Drawing Figures

CONDUCTIVITY $\sigma$ $(\Omega\text{-CM})^{-1}$ y IN $Li_{4-2y}Si_{1-y}S_yO_4$

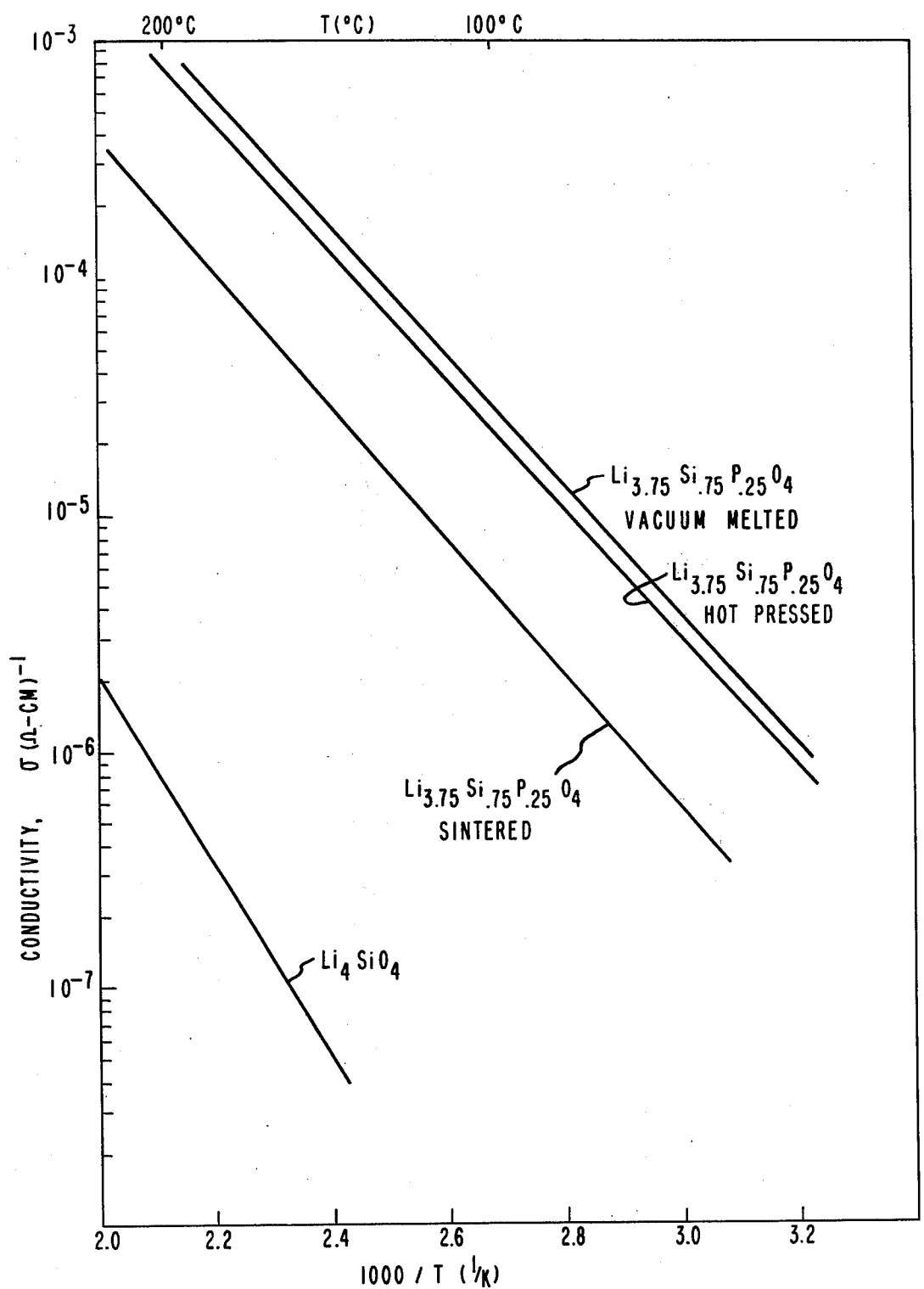

SUBSTITUTED LITHIUM ORTHOSILICATES AND SOLID ELECTROLYTES THEREFROM

RELATIONSHIP TO OTHER APPLICATIONS

This application is a continuation-in-part of copending application Ser. No. 651,585 filed Jan. 22, 1976, now abandoned.

BACKGROUND OF THE INVENTION

1. Field of the Invention

This invention relates to Li-conducting lithium orthosilicates and more particularly to such orthosilicates in which a portion of the silicon is replaced by at least one of A l, P, and S and to their use as solid electrolytes in electrochemical cells.

2. Description of the Prior Art

Solid ionic conductors with Li+ as the mobile species are desirable for use as solid electrolytes.

Li has long been regarded as a desirable component of galvanic cells. It is inexpensive and its unparalleled reduction potential ($E°_{red} = -3.024v$) and light weight have often suggested its use as the anodic component in high energy-density storage batteries. (See, for example, S. Pizzini, J. Appl. Electrochem 1, 153 (1971)). The reactivity of Li with water has required the use of non-aqueous electrolytes such as organic-soluble lithium perchlorates, or fused lithium halides. Li+ conductors which are solid would be quite useful in such untilities; these conductors also serve to separate the anodic and cathodic components.

Solid electrolytes and in particular completely solid state galvanic cells offer special advantages as low-energy density, low-power density primary batteries. These advantages include the possibility for long shelf life, broad temperature limits of operability and miniaturization. A Li+ conducting solid electrolyte would provide the basis for a lighter and lower cost alternative to the solid state batteries which rely on the transport of Ag+ in various silver halides.

One such Li+ conducting solid electrolyte is lithium orthosilicate. The structure of the compound lithium orthosilicate $Li_4SiO_4$ was determined by H. Vollenkle, A. Wittmann and H. Nowotny, Monat. Chem. 99, 1360 (1968). It consists of isolated $SiO_4$ tetrahedra linked by $LiO_n$ polyhedra where $n = 4,5,6$. According to Vollenkle et al, all the lithium sites are partially occupied. Some of the $SiO_4$ tetrahedra share edges with the $LiO_n$ polyhedra and the polyhedra are often linked together by sharing common faces.

A. R. West, J. Appl. Electrochem., 3, 327 (1973) has discussed the ionic conduction of $Li_4SiO_4$ and related phases in which $Zn^{2+}$, $Mg^{2+}$, or $Al^{3+}$ partially replaces Li+ and also those in which $Ge^{4+}$ or $Ti^{4+}$ partially replaces $Si^{4+}$. Conductivity measurements were reported for $Li_4SiO_4$ and representative Ge-, Ti-, and Zn-containing compositions. The conductivity of $Li_4SiO_4$ at 200° C is reported as $1 \times 10^{-6}$ $(\Omega\text{-cm})^{-1}$. $Ti^{4+}$-substituted compositions resulted in conductivities higher than that of $Li_4SiO_4$ while $Zn^{2\pm}$ and $Mg^{2\pm}$ substituted compositions resulted in conductivities lower than that of $Li_4SiO_4$. The highest conductivity reported at 200° C is $5 \times 10^{-5}$ $(\Omega\text{-cm})^{-1}$.

In West, there is no mention of substituting $Al^{3+}$, $P^{5+}$, or $S^{6+}$ for some of the $Si^{4+}$ with corresponding compensation in the amount of Li+ present. West does note that the change in fractional occupancy of the various lithium sites with solid solution composition cannot be determined a priori and that these lithium site occupancies will probably vary in a different manner along each solid solution series so that in order to know the occupancies (and from this to have some indication about the conductivity) for any particular composition, full refinement of the structure of a single crystal of that composition would be needed.

The known Li+ conductors with the highest conductivities are LiI mixed with $CaI_2$ (C. R. Schlaiker and C. C. Liang, Proc, NATO Adv. Study Inst. of Fast Ion Transport, Sept. 5, 1972); single crystals of lithium β-alumina $LiAl_{11}O_{17}$ (M. S. Whittingham and R. A. Huggins, NBS Spec. Pub. 364, Solid State Chemistry, 139 (1972)) and single crystals of certain of the Cl—Br lithium haloboracites (Bither and Jeitschko, U.S. Pat. NO. 3,911,085). All have conductivities at 200° C of the order of $10^{-3}$ $(\Omega\text{-cm})^{-1}$.

Two recently issued Japanese patents discuss the phases $Li_2SO_4.LiOH.LiI$ and $Li_2SO_4.LiOH$ with conductivities of $5 \times 10^{-2}$ $(\Omega\text{cm})^{-1}$ and $1.5 \times 10^{-2}$ $(\Omega\text{cm})^{-1}$, respectively at 200° C (Japanese Kokai: Nos. 49-81899 and 49-81898, issued Aug. 7, 1974). However, these phases appear to melt below 200° C and therefore are not useful as solid electrolytes at a temperature of 200° C or above.

SUMMARY OF THE INVENTION

According to the present invention there is provided a composition having (a) the general formula:

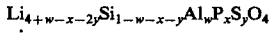

$$Li_{4+w-x-2y}Si_{1-w-x-y}Al_wP_xS_yO_4$$

wherein
w is 0 to about 0.45,
x is 0 to about 0.5, and
y is 0 to about 0.35, with the proviso that one or both w or $x+2y$ is at least about 0.1, and b. the monoclinic $Li_4SiO_4$ crystal structure.

There is also provided an electrochemical device for transporting lithium ions having (a) two electrodes one of which is lithium; (b) a solid electrolyte separating the two electrodes; and (c) an inert connecting electrode to complete an electrical circuit between the two electrodes wherein the solid electrolyte consists essentially of the aforesaid composition.

BRIEF DESCRIPTION OF THE DRAWINGS

FIG. 4 is a graph showing the temperature dependence of the conductivity of $Li3.75Si.75Si.75P.25O_4$ samples which were prepared by various techniques compared to pure lithium orthosilicate.

DETAILED DESCRIPTION OF THE INVENTION

Figure 1:
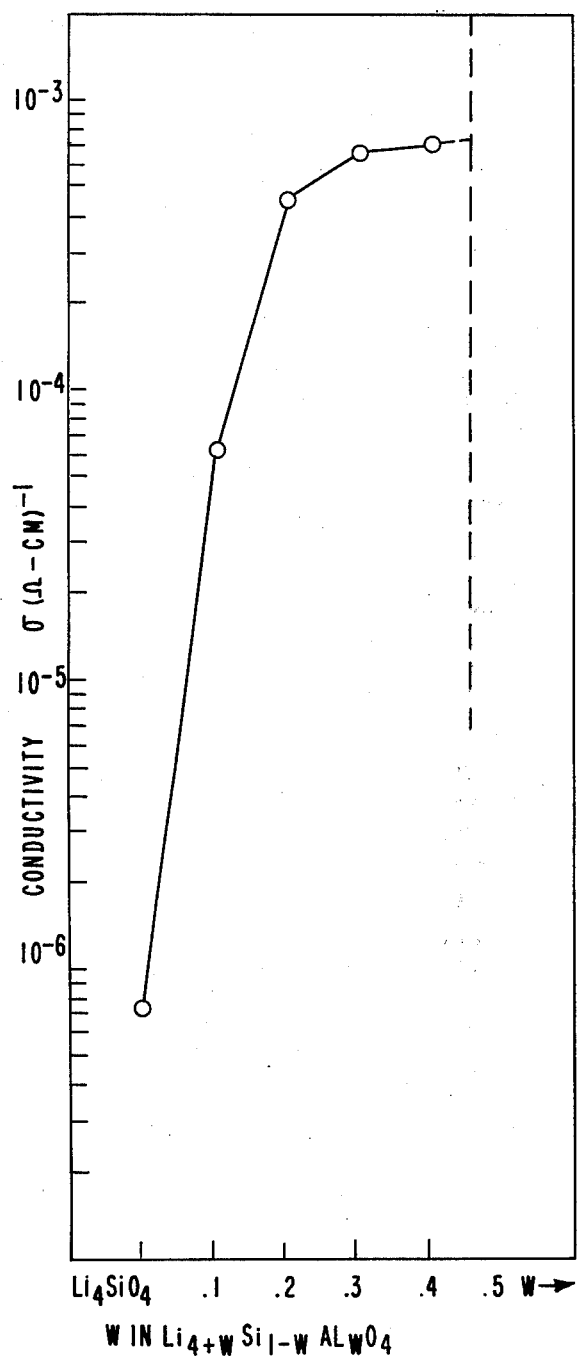
FIG. 1 is a graph showing the conductivity of the Al-containing compositions, $Li_{4+w}Si_{1-w}Al_wO_4$, as a function of Al content.

The lithium orthosilicates of this invention in which a portion of the silicon is replaced by at least one of Al, P and S are crystalline solids which exhibit high Li+ conduction at unexpectedly low temperatures. For example, at 200° C the conductivities of the instant compositions are considerably larger than the parent Li$_4$SiO$_4$ or other types of substituted orthosilicates previously reported and are sufficiently large to make these compositions useful as solid electrolytes. The compositions have a monoclinic crystal structure as determined by X-ray diffraction patterns.

The compositions of the invention have Si$^{4+}$ in lithium orthosilicate partially replaced by at least one of Al$^{3+}$, P$^{5+}$, and S$^{6+}$. The compositions have a. the formula $$Li_{4+w-x-2y}Si_{1-w-x-y}Al_wP_xS_yO_4$$

wherein w is 0 to about 0.45, x is 0 to about 0.5, and y is 0 to about 0.35, with the proviso that one or both of w or x+2y is at least about 0.1, and b. the monoclinic Li$_4$SiO$_4$ crystal structure.

Preferred singly-substituted compositions have the general formula:

$$Li_{4+w-x-2y}Si_{1-w-x-y}MO_4$$

wherein

M is

Al$_w$ where w is a number from about 0.1 to about 0.45 and x and y are each zero, P$_x$ where x is a number from about 0.1 to about 0.5 and w and y are each zero, or S$_y$ where y is a number from about 0.05 to about 0.35 and w and x are each zero.

Particularly preferred singly-substituted compositions within the general formula which have good conductivity have the formulas:

$$Li_{4+w}Si_{1-w}Al_wO_4 \quad (1)$$

where w is from about 0.1 to about 0.45, preferably from about 0.2 to about 0.45; A composition of this formula with w greater than about 0.45 no longer exhibits a monoclinic structure.

$$Li_{4-x}Si_{1-x}P_xO_4 \quad (2)$$

Where x is from about 0.1 to about 0.5, preferably from about 0.15 to about 0.5; and $$Li_{4-2y}Si_{1-y}S_yO_4 \quad (3)$$

where y is from about 0.05 to about 0.35, preferably from about 0.15 to about 0.35.

In order to retain the monoclinic Li$_4$SiO$_4$ crystal structure, the amount of Si$^{4+}$ replaced should be no greater than about 50%, depending on the substituting ion. Thus, w+x+y should be no greater than about 0.5. Similarly, the amount of Li in the compositions between about 3.3 and 4.45. Thus, w−x−2y should be no less than about −0.7 and no greater than about 0.45. The exact degree of Si$^{4+}$ substitution depends on the substituting ion. For example, for the singly substituted composition — with Al, up to about 45% of the Si can be replaced; with S, up to about 35% of the Si can be replaced; and with P, up to about 50% of the Si can be replaced.

A detailed understanding of the conduction mechanisms of the present compositions must await detailed structure analyses to determine the lithium occupancy of various sites for any given type of substitution. While the invention is not limited by an assumed model for conduction, it is assumed that substitution of P$^{5+}$ or S$^{6+}$ for Si$^{4+}$ results in Li+ vancancies while substitution of Al$^{3+}$ for Si$^{4+}$ results in Li+ interstitials. The vacancies and interstitials result in the increase in the conductivity of the substituted compositions as compared to that of Li$_4$SiO$_4$. When z parts of Al$^{3+}$ and P$^{5+}$ are substituted for Si$^{4+}$, the composition formula becomes Li$_4$Si$_{1-2z}$Al$_z$P$_z$O$_4$; similarly when z part of Al$^{3+}$ and z/2 part of S$^{6+}$ are substituted for Si$^{4-}$, the composition formula is Li$_4$Si$_{1-3z}$Al$_z$S$_{z/2}$O$_4$. These compositions and similar ones containing 2z part Al$^{3+}$, z part P$^{5+}$ and z/2 part S$^{6+}$ might be expected to have the same Li+ distribution and relatively low ionic conductivity exhibited by Li$_4$SiO$_4$. Surprisingly, such is not the case and these compositions have conductivities comparable to other compositions of this invention. While this conductivity appears to be an inherent property of the material, there is the possibility that a second amorphous phase might be formed during the preparation of the compositions and this would be undetected by x-rays.

The compositions of this invention can be prepared by conventional solid state reaction methods. The reactants, which are preferably reagent or commercial grade oxides, hydroxides, carbonates, nitrates, phosphates, sulfates, or the like of lithium, and a source of silicon such as silica or lithium orthosilicate, are thoroughly mixed in amounts appropriate to the desired stoichiometry. This mixture is then heated in a crucible made of any material which will not react with the product, e.g., platinum, silver or gold can be used. The temperature of the reaction is not critical but must be sufficiently high so as to allow the reaction to occur. Temperatures in the range of about 500°–1100° C are generally satisfactory. The reaction time is also not critical but should be long enough to allow essentially complete reaction of the reaction components. Usually 8–24 hrs. is satisfactory. As is well known to those familiar with solid state reactions, in order to promote the completion of the reaction, it is sometimes advantageous to interrupt the heating, regrind the product, and then complete the heating cycle. Upon completion of the heating cycle, the sample is air or water quenched.

A characteristic feature of the compositions of this invention is their monoclinic crystal structure. This can be determined from the characteristic X-ray diffraction pattern that is readily obtained by a number of methods as described in standard references such as B. D. Cullity "Elements of X-ray Diffraction" Addison-Wesley, Reading, Mass. (1956). The Hagg-Guinier powder patterns of all the compositions of this invention are quite similar and closely resemble that of Li$_4$SiO$_4$.

Occasionally some of the products of this invention contain small quantities of unreacted starting materials or unidentified impurity phases which are evidenced by weak diffraction lines not indexable on the monoclinic unit cell. The amount of impurity phase is not known precisely but it is believed to be present in quantities less than several percent by weight. These impurities do no appear to significantly alter the conductivity of the product.

The conductivities of the products of this invention can be measured using both a-c and d-c methods. To carry out the conductivity measurements, a pellet or disc formed from a composition of the invention is mounted in a stainless steel holder between two discs of Li foil, 0.015 inch thick, suppported on Ni screens. The sample temperature is raised above the melting point of Li metal to assure good contact. The ac conductance is measured using a Wayne-Kerr universal bridge at a frequency of $10^4 \sec^{-1}$. The dc conductivity is checked by applying slowly varying voltages (triangular wave forms with a frequency less than 0.01 Hz) and recording the current. Excellent agreement with the ac results are usually obtained.

The disc for measuring conductivity is prepared from a powder of a composition of this invention. For convenience, the disc will have a thickness between 0.45 cm and 1.2 cm and a diameter between 1.1 cm and 1.25 cm. These discs are generally prepared by sintering, i.e., the powder is pressed in a steel die at a pressure of the order of 12,000 psi and the formed disc then heated to a temperature of about 1000° C for 4 hours and rapidly cooled in air. In order to increase the density of the sintered discs, it is advantageous to grind the powder products in an agate ball mill for about 2 hours before pressing and firing. Alternatively, the pressed disc is hotpressed by placing it in a graphite die. The pressure, temperature and time of pressure is not critical, but a typical sample is pressed at a pressure of 4000 psi while heating at a temperature of 1100° C for 15 minutes. Still another method for forming a disc involves vacuum melting. Following the heating cycle, the sample is placed in a graphite crucible in an induction heating unit and melted at about 1200° C in a $N_2$ atmosphere. A vacuum is applied to the molten material for about 15 minutes; it is then slow cooled to 300° C and $N_2$ allowed to re-enter the chamber. The resultant disc is hard and dense.

The compositions of this invention are useful as solid electrolytes which pass currents of $Li^+$. These compositions can be used in galvanic cells such as highenergy density storage batteries which most probably would operate at elevated temperatures with molten Li as the anode source of lithium ions and liquid sulfur, selenium, or tellurium as the cathode which serves to remove the lithium ions by forming a composition approaching e.g., $Li_2S$.

Figure 5:
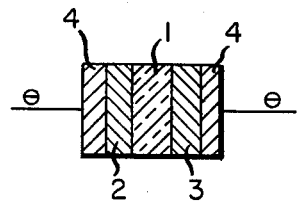
FIG. 5 is an illustrative, cross-sectional drawing of a primary cell using a composition of the invention as the solid electrolyte.

These compositions can also be used in low drain, low power density primary batteries including completely solid state primary batteries. FIG. 5 shows a primary battery with a lithium phosphosilicate electrolyte 1. The anode 3 for such batteries can consist of Li metal, LiAl, or a LiHg amalgam; the cathode 2 may be $Li_2MoV_{1-2}O_{34}$, $Cu_2S$, $Li_xV_2O_5$, $Li_xMoO_3$, $TiS_2$ or similar materials which react with and thereby remove the lithium. Connector electrodes 4 make an electrical circuit between the Li metal anode and the $Li^+$-removing cathode. An all-solid cell would be encapsulated to prevent reaction of the components with the atmosphere. Completely solid state cells offer the advantages of long shelf life, broad temperature range of operability and miniaturization.

Another electrochemical device in which the compositions of the invention can be used is one for electrowinning or purifying lithium metal. A carbon electrode situated in a molten alloy, an electrically dissociable molten salt or impure solution serves as anode. Illustrative materials for anode are $LiCl$, $AlCl_3$, LiHg amalgam or $LiNO_3$. $Li^+$ ions are transported from this anode through a solid electrolyte of one of the instant compositions and converting these ions to elemental lithium at the lithium cathode.

Other devices in which these solid electrolytes can be used, e.g., coulometers, timers, etc, will be obvious to those skilled in the art.

EMBODIMENTS OF THE INVENTION

The following examples, illustrating the preparation of the Al-, P-, and S-containing compositions of this invention and their use as solid electrolytes are given.

EXAMPLE 1

A mixture of 46.982 g $Li_3PO_4$, 179.886 g $Li_2CO_3$, and 73.132 g $SiO_2$ (corresponding to the composition $Li_{3.75}Si_{.75}P_{.25}O_4$) was heated at 700° C for 4 hrs. in a mullite crucible. This mixture was then ball milled and subsequently heated to 1000° C in a Pt crucible for 15 hrs. and quenched in a water bath. An X-ray diffraction powder pattern obtained using a Hagg-Gunier camera with a single-phase $Li_{3.75}Si_{.75}P_{.25}O_4$ made in a manner similar to that indicated above is given in Table I. Analysis of this data showed a monoclinic unit cell with $a = 5.11 \pm .01$ A, $b = 6.11 \pm .01$ A, $c = 5.30 \pm .01$ A and $\beta = 90.4 \pm .1°$.

TABLE I

X-Ray Diffraction Pattern of $Li_{3.75}Si_{.75}P_{.25}O_4$

| hkl | | | $d_{obs}$ | $I/I_o$* |
|---|---|---|---|---|
| 0 | 0 | 1 | 5.286 | 30 |
| 1 | 0 | 0 | 5.109 | 5 |
| 0 | 1 | 1 | 4.000 | 95 |
| 1 | 1 | 0 | 3.919 | 60 |
| 1 | 0 | 1 | 3.664 | 30 |
| 0 | 2 | 0 | 3.053 | 15 |
| 0 | 2 | 1 | 2.647 | 100 |
| 0 | 0 | 2 | | |
| 1 | 2 | 0 | 2.622 | 20 |
| 2 | 0 | 0 | 2.555 | 30 |
| −1 | 0 | 2 | 2.354 | 5 |
| −1 | 2 | 1 | | |
| 2 | 1 | 0 | | |
| 1 | 1 | 2 | 2.190 | 10 |
| −1 | 1 | 2 | | |
| −1 | 2 | 2 | 1.868 | 5 |
| −2 | 0 | 2 | 1.842 | 15 |
| −2 | 2 | 1 | | |
| −1 | 3 | 1 | 1.783 | 40 |
| 1 | 0 | 3 | 1.665 | 2 |
| −1 | 0 | 3 | | |
| 0 | 3 | 2 | 1.614 | 2 |
| 0 | 4 | 0 | 1.527 | 40 |
| 0 | 2 | 3 | | |
| −2 | 3 | 1 | | |
| 3 | 2 | 0 | 1.487 | 2 |
| 0 | 4 | 2 | 1.323 | 2 |
| 0 | 0 | 4 | | |
| 2 | 4 | 0 | 1.310 | 2 |

*The most intense line is arbitrarily assigned an intensity of 100.

EXAMPLE 2

In another synthesis of $Li_{3.75}Si_{.75}P_{.25}O_4$, a mixture of 0.783 g $Li_3PO_4$, 2.998 g $Li_2CO_3$ and 1.219 g $SiO_2$ is placed in a platinum crucible, heated to 1000° C for 15 hours and quenched in $H_2O$. The $Li_{3.75}Si_{.75}P_{.25}O_4$ product is a white powder. X-ray analysis showed the product to be single phase except for several lines due to an impurity phase (probably less than 2–3%). The diffraction pattern of this powder is very much like the one shown in Table I for Example 1 and indicates a monoclinic unit cell with $a = 5.11 \pm .01$ A, $b = 6.11 \pm .01$ A, $c = 5.29 \pm .01$ A and $\beta = 90.3 \pm 0.1°$ in agreement within experimental uncertainty of the results obtained for the sample of Example 1.

A sample was prepared in the form of a disc 0.68 cm × 1.21 cm diameter by pressing the powder in a steel die at a pressure of 12,000 psi, heating the disc to a temperature of 1000° C for 4 hr and rapidly cooling in air. The sample was mounted in a stainless steel holder between two discs of Li foil, 0.015 inch thick, supported on Ni screens. The sample temperature was raised above the melting point of Li metal to assure good contact. The a-c conductance was measured using a Wayne-Kerr universal bridge at a frequency of $10^4$ sec$^{-1}$. The sample showed a conductivity of $2 \times 10^{-4}$ ($\Omega$ cm)$^{-1}$ at 200° C with a temperature dependence indicated in FIG. 4 by the curve labeled "sintered". The d-c conductivity was checked by applying slowly varying voltages (triangular wave forms with a frequency less than 0.01 Hz) and recording the current. Excellent agreement with the a-c results were obtained. Upon removal of the sample, the Li was cleaned from the faces, and no apparent attack by the Li was observed.

EXAMPLE 3

A portion of the $Li_{3.75}Si_{.75}P_{.25}O_4$ product from Example 1 was placed in a carbon crucible in a Lepel induction unit and melted at about 1200° C in a $N_2$ atmosphere. After melting was complete the chamber was evacuated for 15 minutes after which the sample was slow cooled to 300° C and $N_2$ allowed to re-enter the chamber. The ionic conductivity of the resultant dense disc was measured as described in Example 2. The temperature dependence of the conductivity is shown by the curve labeled "vacuum melted" in FIG. 4.

EXAMPLE 4

A portion of the $Li_{3.75}Si_{.75}P_{.25}O_4$ product from Example 1 was pressed into a disc 10mm thick and 12mm in diameter. This disc was placed in a graphite die and pressed at a pressure of 4000 psi and a temperature of 1100° C for 15 minutes. The ionic conductivity of the resultant transluscent disc was measured as described in Example 2. The temperature dependence of the conductivity is shown by the curve labeled "hot-pressed" in FIG. 4. As can be seen in FIG. 4, a large increase in conductivity was achieved by preparing the discs by hot-pressing or vacuum methods rather than by sintering.

CONTROL A

Discs of $Li_4SiO_4$ and the previously known substituted compositions in which Mg, Zn and Al replace some of the lithium were also made and conductivities measured. The $Li_4SiO_4$ disc showed a conductivity of about $1 \times 10^{-6}$ (ohm-cm)$^{-1}$ at 200° C which is in agreement with that reported by A. R. West, J. Appl. Electrochem. 3, 327 (1973).

A Zn-containing composition $Li_3Zn_{.5}SiO_4$ showed a conductivity of $7 \times 10^{-4}$ (ohm-cm)$^{-1}$ at 200° C. This is $10^3$ times that measured for $Li_4SiO_4$ and in sharp contrast to the results for Zn-containing cmpositions reported by West who found that substitution of Zn for Li resulted in a lowering of the conductivity relative to $Li_4SiO_4$. No explanation for this difference in behavior can be offered. Despite the high conductivities, the Zn-containing compositions do not appear to be useful as Li+ passing electrolytes in contrast to the compositions of this invention since the lithium-zinc orthosilicates are subject to attack by molten Li.

While the compositions with Mg and Al substituted for Li were known, no conductivity measurements were reported. These compositions exhibited conductivities which were larger than those of the pure $Li_4SiO_4$; however, the largest conductivity measured at 200° C was $2 \times 10^{-5}$ (ohm-cm)$^{-1}$, an order of magnitude or more below those found for the preferred compounds of the instant invention.

EXAMPLES 5 – 8

Figure 2:
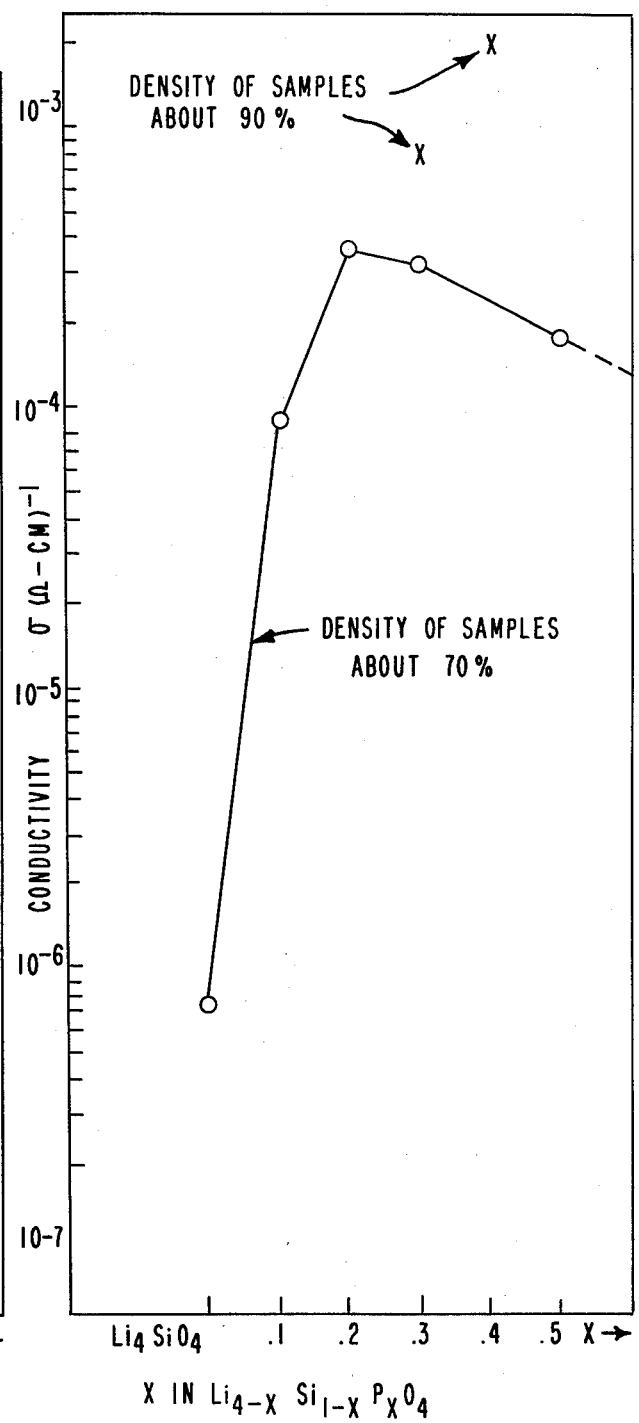
FIG. 2 is a graph showing the conductivity of the P-containing compositions, $Li_{4-x}Si_{1-x}P_xO_4$, as a function of P content and the effect of sintered sample densities on the observed conductivities.

Compositions containing various amounts of P were made by mixing the amounts of $Li_3PO_4$, $Li_2CO_3$ and $SiO_2$ dictated by the stoichiometry of the desired composition, heating the mixtures to cause the reaction to take place, and quenching the product in water. Discs were sintered from the powder in order to measure the conductivity as described in Example 2. These discs typically have densities of about 70% of the theoretical density, e.g., the discs of Examples 5 and 6 had densities of 73% and the disc of Example 7 had a density of 72%. The quantities of reactants, the heating conditions and the monoclinic cell constants deduced from X-ray powder patterns which are similar to that shown in Table I for Example 1 are shown in Table II. As in Example 2, weak impurity lines are present for some samples. The conductivities measured at 200° C are shown in FIG. 2.

TABLE II

| Example No. | Product | Reactants (g) | | | Monoclinic Cell Constants | | | | Heating Conditions |
|---|---|---|---|---|---|---|---|---|---|
| | | $Li_3PO_4$ | $Li_2CO_3$ | $SiO_2$ | a (A) | b (A) | c (A) | $\beta°$ | |
| 5 | $Li_{3.9}Si_{.9}P_{.1}O_4$ | .292 | 3.348 | 1.361 | 5.13 ± .01 | 6.11 ± .01 | 5.30 ± .01 | 90.3 ± .1 | Heated at 1000° C for 4 hr, reground and heated at 1000° C for 15 hr |
| 6 | $Li_{3.8}Si_{.8}P_{.2}O_4$ | .611 | 3.120 | 1.268 | 5.12 | 6.11 | 5.30 | 90.3 | " |
| 7 | $Li_{3.7}Si_{.7}P_{.3}O_4$ | .964 | 2.870 | 1.167 | 5.12 | 6.11 | 5.30 | 90.3 | " |
| 8 | $Li_{3.5}Si_{.5}P_{.5}O_4$ | 1.789 | 2.283 | .928 | 5.11 | 6.11 | 5.30 | 91.6 | Heated at 800° C for 4 hr, reground and heated at |

TABLE II-continued

| Example No. | Product | Reactants (g) Li₃PO₄ | Li₂CO₃ | SiO₂ | Monoclinic Cell Constants a (A) | b (A) | c (A) | β° | Heating Conditions |
|---|---|---|---|---|---|---|---|---|---|
|  |  |  |  |  |  |  |  |  | 800° C for 15 hr |
|  |  |  |  |  |  |  |  |  | " |

EXAMPLE 9

A mixture of 3.671 g LiOH. H₂O, 0.401 g Al(OH)₃ and 0.928 g SiO₂ corresponding to the composition $Li_{4.25}Si_{.75}Al_{.25}O_4$ was heated in an Ag crucible at 400° C for 4 hr, 600° C for 4 hr, 800° C for 4 hr. The material was removed and reground in a mortar and pestle and then heated at 850° C for 15 hr. The sample was quenched in a water bath. The $Li_{4.25}Si_{.75}Al_{.25}O_4$ product is a white powder with an X-ray diffraction pattern similar to that shown in Table I for Example 1, but with a few lines from an impurity phase. The monoclinic unit cell derived from this pattern gave $a = 5.15 \pm .01$ A, $b = 6.15 \pm 0.01$ A, $c = 5.34 \pm .01$ A and $\beta = 90.2 \pm 0.1°$.

EXAMPLES 10-13

Compositions containing various amounts of Al were made by mixing the quantities of reactants listed in Table III and heating the mixtures as described in Table III. The X-ray powder patterns are similar to that shown in Table I for Example . The monoclinic structure is indicated and derived cell constants are presented in Table III. Discs were sintered from the powders in order to measure the conductivity in the manner described in Example 2. The conductivities measured at 200° C are shown in FIG. 1.

EXAMPLE 14

A mixture of 0.933 g Li₂SO₄ and 4.067 g Li₄SiO₄ corresponding to the composition $Li_{3.6}Si_{.8}S_{.2}O_4$ was heated in a Pt crucible at 900° C for 15 hr, then reground and fired again at 900° C for 3 hours and air quenched. The single phase $Li_{3.6}Si_{.8}S_{.2}O_4$ product is a white powder. Analysis of the X-ray diffraction pattern, which is similar to that shown in Table I for Example 1, indicates a monoclinic unit cell with $a = 5.08 \pm 0.01$ A, $b = 6.15 \pm 0.01$ A, $c = 5.32 \pm 0.01$ A and $\beta = 90.4 \pm 0.1°$.

A sintered disc for ac/dc conductivity measurements of the type described for Example 2 was made by pressing the powder at 40,000 psi and heating the resultant disc at 900° C for 15 hrs. The sample was allowed to cool in the furnace to a temperature of 470° C and then air quenched. The conductivity at 200° C is shown on FIG. 3, $9 \times 10^{-4} (\Omega \text{ cm})^{-1}$.

EXAMPLES 15-18

Compositions containing various amounts of S were made by mixing the appropriate quantities of reactants and heating the mixture as described in Table IV. The products were single phase as evidenced by the lack of foreign X-ray diffraction lines. Also shown in Table IV are the monoclinic cell constants deduced from X-ray powder patterns which are similar to that shown in Table I for Example 1.

Figure 3:
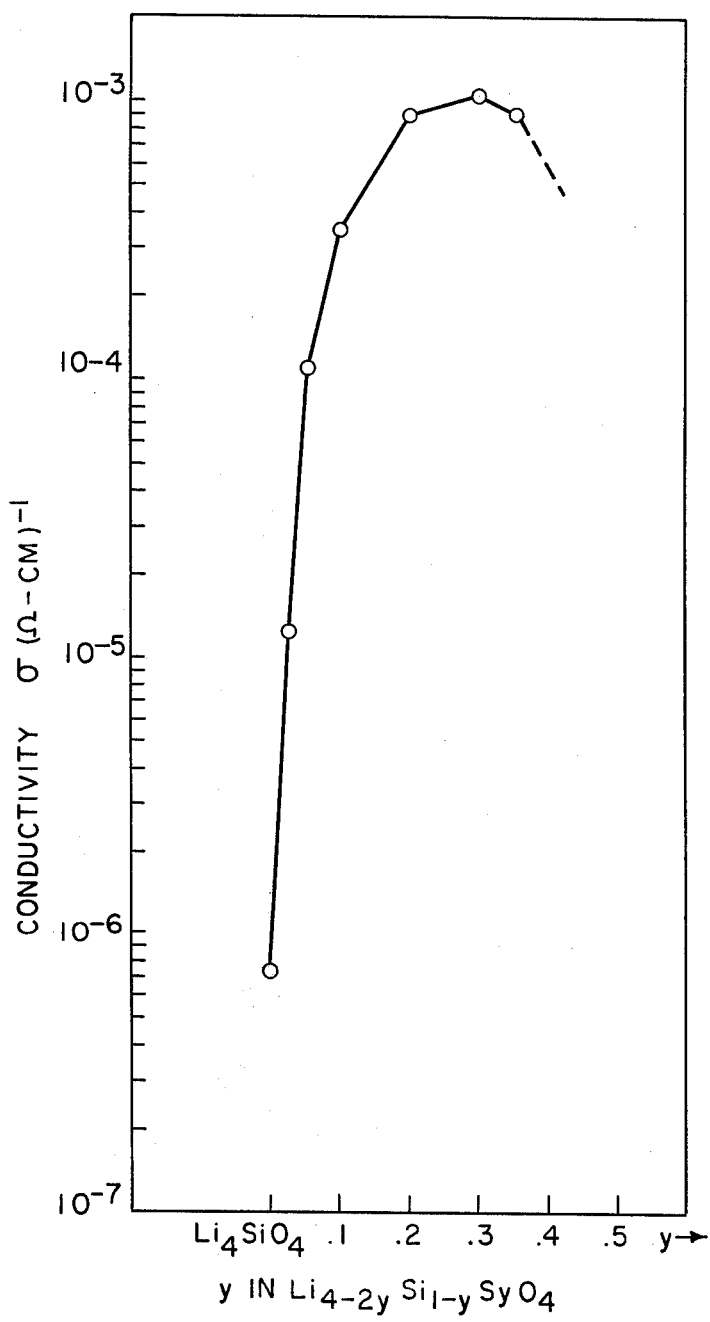
FIG. 3 is a graph showing the conductivity of the S-containing compositions, $Li_{4-2y}Si_{1-y}S_yO_4$, as a function of S content.

Sintered discs for ac/dc conductivity measurements described in Example 2 were prepared in the manner described in Example 14. Conductivities measured at 200° C are shown in FIG. 3.

TABLE IV

| Example No. | Product | Reactants (g) Li₂SO₄ | Li₄SiO₄ | Monoclinic Cell Constants a (A) | b (A) | c (A) | β° | Heating Conditions |
|---|---|---|---|---|---|---|---|---|
| 15 | Li₃.₈Si.₉S.₁O₄ | .463 | 4.538 | 5.11 ± .01 | 6.14 ± .01 | 5.30 ± .01 | 90.2 ± .1 | Same as Example 14 |
| 16 | Li₃.₉Si.₉₅S.₀₅O₄ | .230 | 4.770 | 5.15 | 6.12 | 5.30 | 90.4 | " |
| Control B | Li₃.₉₅Si.₉₇₅S.₀₂₅O₄ | .230 | 9.770 | 5.14 | 6.11 | 5.29 | 90.2 | " |
| 17 | Li₃.₄Si.₇S.₃O₄ | 1.411 | 3.589 | 5.08 | 6.14 | 5.32 | 90.6 | " |
| 18 | Li₃.₃Si.₆₅S.₃₅O₄ | 3.307 | 6.694 | 5.09 | 6.14 | 5.32 | 90.5 | " |

EXAMPLE 19

An intimate mixture of 2.493 g Li₄SiO₄, 0.482 g Li₃PO₄, 0.457 g Li₂SO₄, 0.973 g Al(OH)₃ and 2.618 g LiOH. H₂O was heated in a platinum crucible to 800° C for 16 hours and then quenched in air. The resulting sintered mass was ground to a fine powder. The product corresponds to the nominal composition $Li_4Si_{.5}P_{.1}S_{.1}Al_{.3}O_4$ and the X-ray diffraction pattern, which is similar to that shown in Table I, indicates a single phase product with a monoclinic Li₄SiO₄ structure and lattice parameters $a = 5.13 \pm .01$ A, $b = 6.17 \pm .01$ A, $c = 5.34 \pm .01$ A and $\beta = 90.2 \pm .1°$.

A sintered disc for conductivity measurements of the type described in Example 2 was made by pressing a portion of the powder product at 60,000 psi and heating the resultant disc at 950° C for 20 hrs. The sample was allowed to cool with the furnace. The resulting disc had a density of 91% theoretical. The conductivity at 200° C was $7.8 \times 10^{-4}$ (ohm-cm)$^{-1}$.

TABLE III

| Example No. | Product | Reactants (g) LiOH.H₂O | Al(OH)₃ | SiO₂ | Monoclinic Cell Constants a (A) | b (A) | c(A) | β° | Heating Conditions |
|---|---|---|---|---|---|---|---|---|---|
| 10 | Li₄.₁Si.₉Al.₁O₄ | 3.677 | .167 | 1.156 | 5.14 ± .01 | 6.13 ± .01 | 5.30 ± .01 | 90.2 ± .1 | 800° C 4 hr reground, heated at 850° C, 15 hr. |
| 11 | Li₄.₂Si.₈Al.₂O₄ | 3.673 | .325 | 1.002 | 5.15 | 6.15 | 5.33 | 90.2 | " |
| 12 | Li₄.₃Si.₇Al.₃O₄ | 3.669 | .476 | .855 | 5.15 | 6.17 | 5.36 | 90.3 | " |
| 13 | Li₄.₄Si.₆Al.₄O₄ | 3.665 | .619 | .716 | 5.14 | 6.20 | 5.37 | 90.4 | " |

EXAMPLES 20 - 27

Compositions containing various amounts of Al, P and S were made by mixing the quantities of reactants listed in Table V, heating the mixture in a platinum crucible at 900° for 16 hrs, and then quenching in air. Discs were sintered from ground powder product by pressing at 60,000 psi and then heating at 900° C for 20 hrs. The monoclinic cell constants deduced from X-ray patterns, which indicated a single phase product and are similar to that shown in Table I, are shown in Table V. The conductivities measured at 200° C using the sintered discs are also shown in Table V.

$_2O_{34}$ (lithium-vanadium bronze) as cathode was assembled as shown in FIG. 5.

A lithium-phosphosilicate ($Li_{3.75}Si_{.75}P_{.25}O_4$) pellet, made by hot pressing as described for Example 4, served as the electrolyte 1. The electrolyte is ½ inch in diameter and approximately 0.7 cm thick. A small quantity of lithium-vanadium bronze $Li_2MoV_{12}O_{34}$ was pressed into a pellet ½ inch in diameter and approximately 0.3 cm thick. This pellet was placed on top of the electrolyte pellet and both were heated at 575° C for 15 minutes and then air cooled. The lithium-vanadium bronze serves as the cathode 2. The electrolyte-cathode composite was placed in a sample holder and lithium

TABLE V

| Ex. No. | Product | Reactants (g) | | | | |
|---|---|---|---|---|---|---|
| | | $Li_4SiO_4$ | $Li_3PO_4$ | $Li_2SO_4$ | $Al(OH)_3$ | $LiOH·H_2O$ |
| 20 | $Li_{3.8}Si_{.85}P_{.1}S_{.05}O_4$ | 4.282 | 0.487 | 0.231 | — | — |
| 21 | $Li_{3.7}Si_{.8}P_{.1}O_4$ | 4.047 | 0.489 | 0.464 | — | — |
| 22 | $Li_4Si_{.6}P_{.2}Al_{.2}O_4$ | 2.991 | 0.963 | — | 0.649 | 1.745 |
| 23 | $Li_{4.2}Si_{.6}P_{.1}Al_{.3}O_4$ | 2.967 | 0.478 | — | 0.965 | 2.597 |
| 24 | $Li_{3.8}Si_{.7}P_{.1}S_{.1}Al_{.1}O_4$ | 3.524 | 0.486 | 0.462 | 0.328 | 0.881 |
| 25 | $Li_{3.4}Si_{.6}P_{.2}S_{.2}O_4$ | 3.072 | 0.989 | 0.939 | — | — |
| 26 | $Li_{3.5}Si_{.6}S_{.3}Al_{.1}O_4$ | 3.061 | — | 1.404 | 0.332 | 0.893 |
| 27 | $Li_{3.6}Si_{.6}P_{.1}S_{.2}Al_{.1}O_4$ | 3.046 | 0.491 | 0.931 | 0.330 | 0.889 |

| Ex. No. | Product | Monoclinic Cell Constants | | | | Conductivity at 200° C |
|---|---|---|---|---|---|---|
| | | a(A) | b(A) | c(A) | β° | (ohm cm)$^{-1}$ |
| 20 | $Li_{3.8}Si_{.85}P_{.1}S_{.05}O_4$ | 5.11 ± .01 | 6.13 ± .0 | 5.31 ± .01 | 90.4 ± .1 | $1.0 \times 10^{-3}$ |
| 21 | $Li_{3.7}Si_{.8}P_{.1}O_4$ | 5.09 | 6.13 | 5.31 | 90.4 | $8 \times 10^{-4}$ |
| 22 | $Li_4Si_{.6}P_{.2}Al_{.2}O_4$ | 5.14 | 6.13 | 5.31 | 90.3 | $6.8 \times 10^{-4}$ |
| 23 | $Li_{4.2}Si_{.6}P_{.1}Al_{.3}O_4$ | 5.14 | 6.15 | 5.32 | 90.3 | $6.2 \times 10^{-4}$ |
| 24 | $Li_{3.8}Si_{.7}P_{.1}S_{.1}Al_{.1}O_4$ | 5.10 | 6.14 | 5.31 | 90.3 | $7.2 \times 10^{-}$ |
| 25 | $Li_{3.4}Si_{.6}P_{.2}S_{.2}O_4$ | 5.08 | 6.12 | 5.31 | 91.0 | $1.5 \times 10$ |
| 26 | $Li_{3.5}Si_{.6}S_{.3}Al_{.1}O_4$ | 5.09 | 6.14 | 5.33 | 90.8 | $2.0 \times 10^{-3}$ |
| 27 | $Li_{3.6}Si_{.6}P_{.1}S_{.2}Al_{.1}O_4$ | 5.08 | 6.13 | 5.31 | 89.1 | $1.7 \times 10^{-3}$ |

EXAMPLES 28 - 29

Compositions containing 0.3 and 0.4 P were made by mixing the quantities of LiOH . $H_2O$, $SiO_2$ and $NH_4H_2PO_4$ dictated by the stoichiometry of the desired composition and shown in Table VI and heating the mixture in Ag crucibles as described in Table VI. X-ray patterns revealed primarily lines of the monoclinic phase similar to those shown in Table I. A number of other lines, which could not be indexed on the monoclinic cell appeared; these could be superstructure lines caused by cation ordering. The products were ground in an agate ball mill for 2 hours and discs having densities of about 90–92% of theoretical were sintered from the resultant powder as described in Example 2. Conductivities of the resulting discs are shown in Table VI. Grinding the product powders in an agate ball mill before forming ceramics discs results in the preparation of discs of high density and therefore higher conductivity (compare with conductivities from discs of lower density in FIG. 2).

foil approximately 0.04 cm thick was placed next to the uncoated electrolyte face to serve as the anode 3. The sample holder contains the molten lithium when the cell is heated. Nickel felt discs 4 serves as connector electrodes for the anode and cathode and on the anode side serves to contain the molten lithium.

The aforementioned cell components were pressed together by spring loaded steel rods. The cell was assembled and tested in an Argon dry-box. In the temperature range of 100° to 225° C the open circuit voltage of the cell was 3.6 to 3.7 volts. The cell was discharged at various cell voltages for short periods of time (~5 minutes). The following current-voltage relationships were obtained at 214° C.

| Cell Current | Cell Voltage | |
|---|---|---|
| for geometric area of 1.14 cm$^2$ | | |
| 0 | 3.65 volts | (O.C.V.) |
| 0.09 ma | 2.0 volts | |
| 0.16 ma | 2.5 volts | |
| 0.23 ma | 2.0 volts | |

TABLE VI

| Example No. | Product | Reactants (g) | | | Heating Conditions | % Theoretical Density of Discs | Conductivity at 200° C (ohm-cm)— |
|---|---|---|---|---|---|---|---|
| | | $LiOH H_2O$ | $SiO_2$ | $NH_4H_2PO_4$ | | | |
| 28 | $Li_{3.7}Si_{.7}P_{.3}O_4$ | 3.348 | 0.907 | 0.744 | 400° C, 4 hr, 600° C 4 hr, 850° C 4 hr reground, reheated at 850° C, 16 hr | 92 | $8 \times 10^{-4}$ |
| 29 | $Li_{3.6}Si_{.6}P_{.4}O_4$ | 3.240 | 0.773 | 0.987 | " | 90 | $2 \times 10^{-3}$ |

EXAMPLE 30

A primary cell containing lithium metal as anode, lithium phosphosilicate as electrolyte, and $Li_2MoV_1$.

Subsequently the cell was discharged at 2 volts for 70 minutes. It delivered 0.23 to 0.22 ma during this period of time. The power density output of the cell at 2 volts

What is claimed is:

1. A composition having
a. the formula $$Li_{4+w-x-2y}Si_{1-w-x-y}Al_wP_xS_yO_4$$

wherein
w is 0 to about 0.45,
x is 0 to about 0.5, and
y is 0 to about 0.35,
with the proviso that one or both of w or x+2y is at least about 0.1, and
b. the monoclinic $Li_4SiO_4$ crystal structure.

2. The composition of claim 1 wherein w+x+y is no greater than about 0.5 and w−x−2y is no less than about −0.7.

3. A composition having the formula:

$$Li_{4+w-x-2y}Si_{1-w-x-y}MO_4$$

wherein M is
a. $Al_w$ where w is a number from about 0.1 to about 0.45 and x and y are each zero,
b. $P_x$ where x is a number from about 0.15 to about 0.5 and w and y are each zero, or
c. $S_y$ where y is a number from about 0.05 to about 0.35 and w and x are each zero.

4. The composition of claim 3 having the formula:

$$Li_{4+w}Si_{1-w}Al_wO_4$$

where w is a number from about 0.2 to about 0.45.

5. The composition of claim 3 having the formula:

$$Li_{4-x}Si_{1-x}P_xO_4$$

where x is a number from about 0.15 to about 0.5.

6. The composition of claim 3 having the formula:

$$Li_{4-2y}Si_{1-y}S_yO_4$$

where y is a number from about 0.15 to about 0.35.

7. In an electrochemical device having:
a. two electrodes, one of which is lithium metal, LiAl or a LiHg amalgam;
b. a solid electrolyte separating the two electrodes; and
c. an inert connecting electrode to complete an electrical circuit between the two electrodes;

the improvement wherein the solid electrolyte consists essentially of a composition of claim 1.

8. The device of claim 7 wherein it is an electrolytic cell.

9. The device of claim 7 wherein it is a galvanic cell.

10. The device of claim 8 wherein the solid electrolyte consists essentially of the composition of claim 2.

11. The device of claim 9 wherein the solid electrolyte consists essentially of the composition of claim 2.

12. The device of claim 8 wherein the solid electrolyte consists essentially of the composition of claim 4, claim 5, or claim 6.

13. The device of claim 9 wherein the solid electrolyte consists essentially of the composition of claim 4, claim 5, or claim 6.

* * * * *